United States Patent [19]

Kemp, Jr.

[11] Patent Number: 4,919,011

[45] Date of Patent: Apr. 24, 1990

[54] ROLLER SPEED REDUCTION DRIVE

[75] Inventor: Dennis E. Kemp, Jr., Maplewood, N.J.

[73] Assignee: Mark T. Basseches, Pleasantville, N.Y.; a part interest

[21] Appl. No.: 292,920

[22] Filed: Jan. 3, 1989

[51] Int. Cl.⁵ .................. F16H 13/06; F16H 55/49
[52] U.S. Cl. ................................. 475/183; 474/169
[58] Field of Search ............... 74/797, 798, 203, 766, 74/206, 152, 166, 37, 191, 192, 193, 689, 690; 474/69, 84, 85, 88, 168, 169, 242, 174; 14/191-193

[56] References Cited

U.S. PATENT DOCUMENTS

| | | | |
|---|---|---|---|
| 1,737,997 | 12/1929 | Garrard | 74/798 |
| 2,815,685 | 12/1957 | Parrett | 74/798 |
| 2,966,810 | 1/1961 | Hayes | 74/798 |
| 3,060,767 | 1/1962 | Parrett | 74/798 |
| 3,245,286 | 4/1966 | Hewko | 74/798 |

FOREIGN PATENT DOCUMENTS 54-39763  3/1979  Japan ................ 74/798

Primary Examiner—Dwight G. Diehl
Assistant Examiner—Khori Q. Ta
Attorney, Agent, or Firm—Mark T. Basseches; Paula T. Basseches

[57] ABSTRACT

A planetary speed reducer includes a drive roller having a drive surface, a stator having a concentric drive surface, the respective drive surfaces defining an annular space therebetween. A plurality of rotatable planet rollers have peripheral portion in frictional driving connection with the said drive surfaces of the roller and stator. An output shaft is connected to an assembly which carries the planet rollers.

4 Claims, 6 Drawing Sheets

ROLLER SPEED REDUCTION DRIVE

BACKGROUND OF THE INVENTION

1. Field of the Invention

The present invention is in the field of industrial speed reduction drives and relates more specifically to a compact and cost efficient roller driven rotary speed reduction drive.

2. Prior Art

Speed reducers for industrial use conventionally comprise chain and sprocket drives, belt and pulley drives, and gear drives. Each of the noted types of drives has limitations which are well known to skilled workers in the art.

By way of example, where large speed reductions are required. e.g. in the range of 10:1 or more, none of the known drives has proven commercially satisfactory in general application without the use of three or more driven shafts. More particularly, in belt and pulley drives using two pulleys, a 3:1 or 4:1 ratio is about the maximum generally expected, whereby the achievement of ratios in the 10 to 12 to one or more range mandates two successive stages of speed reduction with the attendant increased expense of providing three or more shafts and associated bearings, etc.

Similar drawbacks inhere in the use of high ratio reduction sprocket drives.

Geared speed reducers are similarly limited in the amount of reduction which may be achieved in a single stage, since, where the sizes of the meshing gears vary widely, driving force is applied through a relatively small meshing-tooth area. Also, geared speed reducers are expensive, due to the inherent machining and finishing operations required in the fabrication of gears, the necessity for providing lubricant containing housings, etc.

While it is known to provide geared planetary speed reduction devices, the complexity of these units render such units suitable for only the most specialized installations where costs are not a significant factor.

SUMMARY OF THE INVENTION

The present invention may be summarized as directed to a rotary speed reduction device which is inexpensive to manufacture, durable, compact, and capable of producing large speed reduction ratios.

More specifically, the invention is directed to a rotary planetary speed reduction device which includes a cylindrical drive surface, a concentrically disposed cylindrical stator surface, and a series of planetary rollers in rolling frictional engagement with the stator and drive roller, the planetary rollers being in driving connection with an output drive member. The output drive member is preferably supported solely by the planet rollers. An apparatus of the type described is capable of producing high ratios of speed reduction, e.g. in the order of 15:1 or more.

Accordingly, it is an object of the invention to provide a rotary speed reduction device which is inexpensive to manufacture, may be manufactured with lesser precision than comparable known speed reducers, is compact, and is highly efficient in the transfer of torque.

Figure 1:
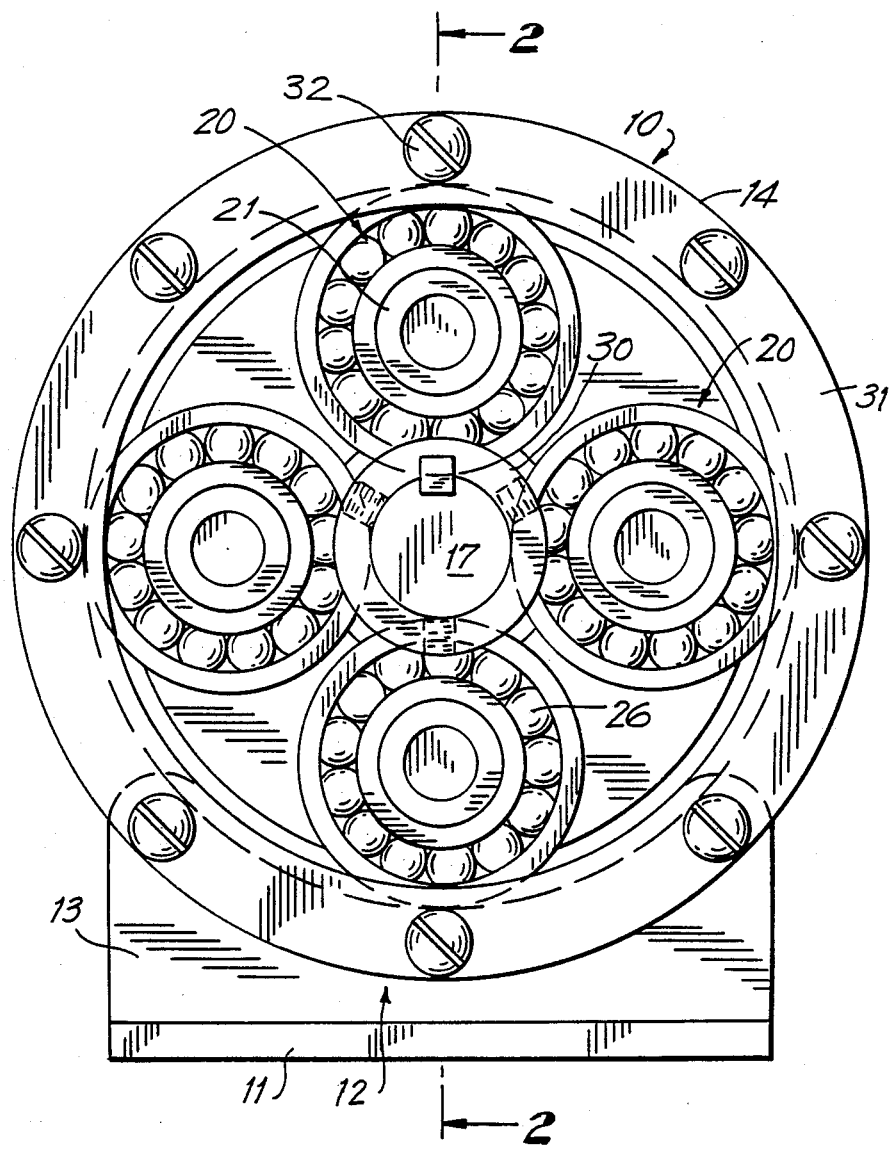
FIG. 1 is a semi-diagrammatic end elevational view of a speed reducer in accordance with the invention.
Figure 2:
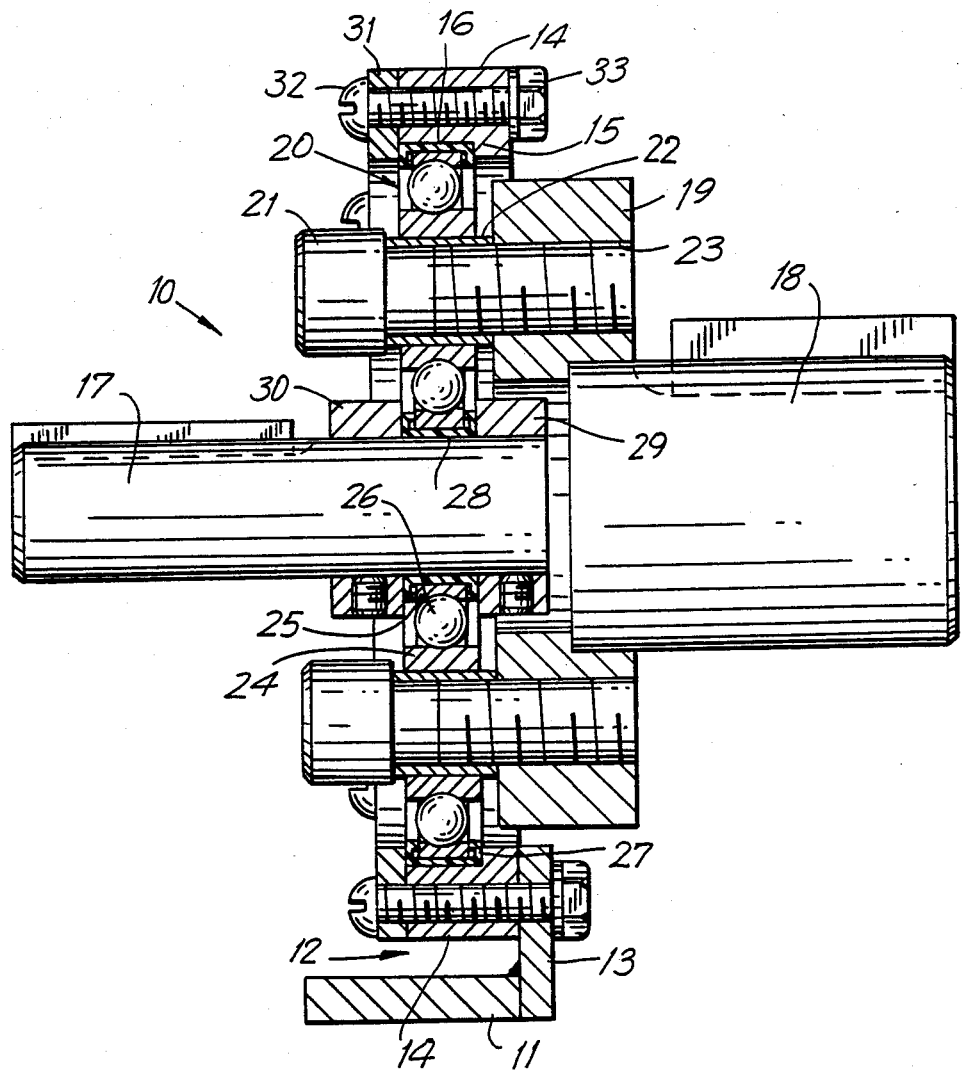
FIG. 2 is a vertical section taken on the line 2—2 of FIG. 1.

Referring now to the drawings and particularly FIGS. 1 and 2 thereof, a speed reduction device 10 is shown as mounted to frame 11. A stator member 12 is secured to arcuate flange 13 extending upwardly from the frame 11.

The stator assembly includes an annular surround 14 having radially inwardly directed flange 15 defining the radial inwardly facing drive surface 16. The drive assembly is mounted within and supported by the stator assembly 12.

The drive assembly includes an input drive shaft 17 adapted to be connected to a prime mover (not shown). Output drive shaft 18 is fixed to annular boss 19. A series of planet roller assemblies 20 (four being shown in the illustrated embodiment) are secured to the boss 19 by mounting bolts 21, the assemblies 20 being equally angularly spaced apart, i.e. offset in the illustrated embodiment by 90°. The mounting bolts 21 extend through bushings 22 and are threaded into complemental apertures 23 formed in the boss 19.

The roller assemblies 20 include an inner bearing race 24 embracing and fixed to the bushings 22. An outer race 25 is separated from the inner race as by ball bearings 26. Preferably the outermost surface of the outer race 25 is covered by a high friction tire or coating 27. In the illustrated embodiment, th tire or coating is shown as an annulus of elastomer but it will be readily appreciated that the member 27 may be comprised of a pneumatically field tire-like structure. The tire 27 of the roller assemblies 20 bear respectively against drive surface 16 of the stator and at their inner periphery against drive surface 28 of drive roller 17.

The planet rollers 20 are fixed at desired longitudinal locations relative to shaft 17 as by spaced collars 29, 30.

A containment ring 31 is affixed to the stator assembly 12 as by bolts 32 passing through the member 14 and supported thereon as by lock nuts 33.

The operation of the device will now be described.

When the shaft 17 is rotated the drive surface 28 of shaft 17, which is in driving connection with the tires 17 of the rollers, will cause the outer race of the rollers to be driven at a linear speed equal to the linear speed of the drive surface 28. The outer surfaces 27 of the rollers 20, which are in driving contact with the track 16 of the stator, will cause the boss 19 and output shaft 18 to rotate in the direction of rotation of shaft 17 but at a reduced rotary speed. The ratio of rotation of input shaft 17 to output shaft 18 is a function of the difference of drive diameters of the drive surface 28 and planets. The reduction ratio may be computed by doubling the diameter described by the planet axis about the pinion axis and dividing the result by the pinion diameter. Thus a one inch diameter pinion driving two inch planets provides 6 to 1 reduction.

Figure 3:
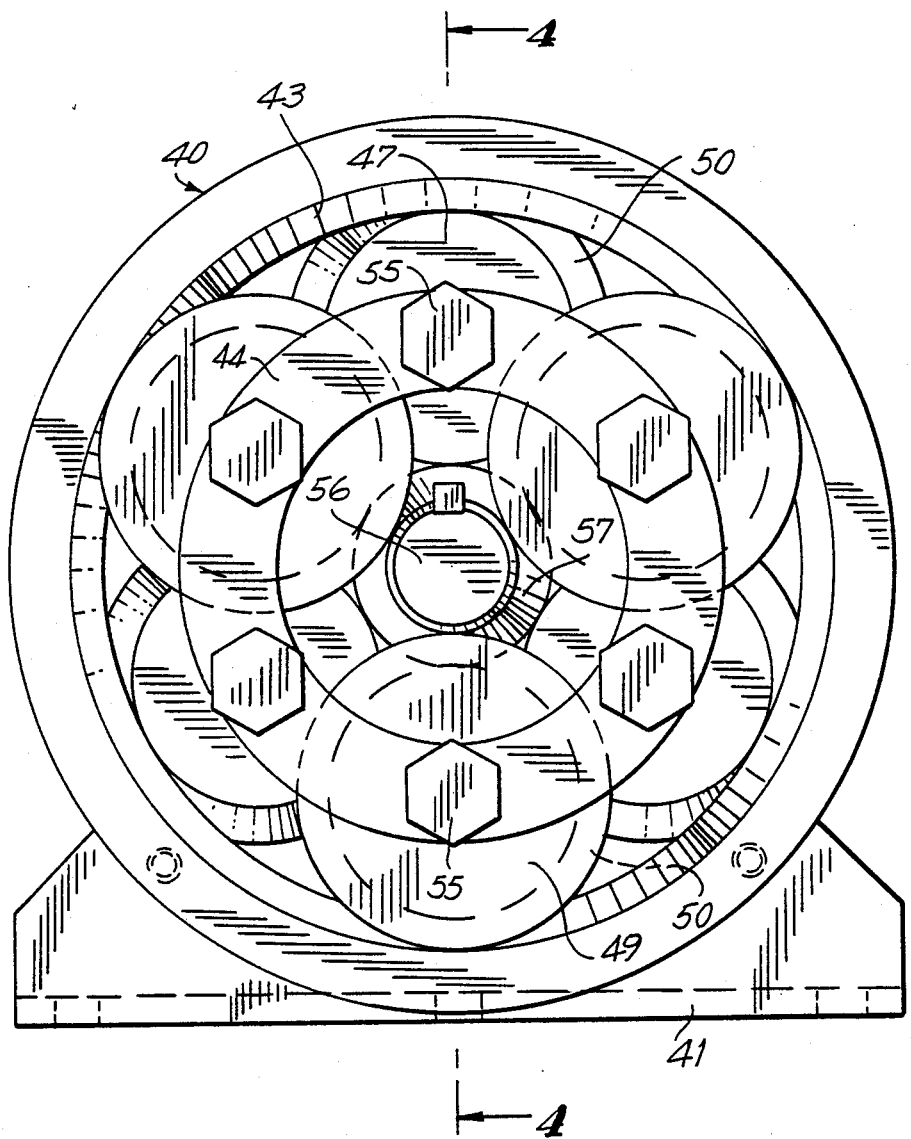
FIG. 3 is an end elevational view of a further embodiment of the invention.
Figure 4:
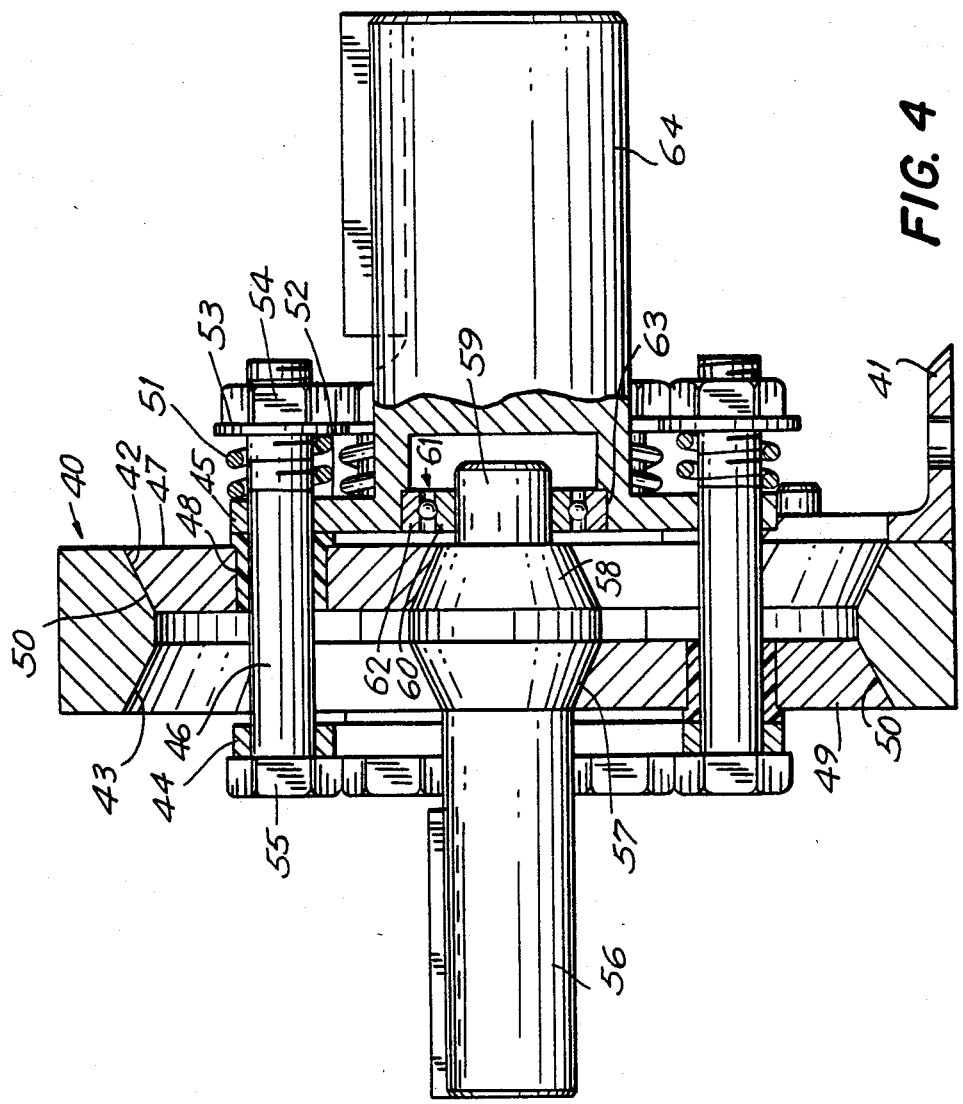
FIG. 4 is a vertical sectional view of the embodiment of FIG. 3 taken on the line 4—4 thereof.

In FIGS. 3 and 4 of the drawing there is disclosed an alternate embodiment of the drive device. In accordance with such embodiment, a stator assembly 40 includes a mounting flange 41 for affixation to a frame.

The stator includes annular beveled drive surfaces 42, 43 inclined toward each other and toward the vertical center plane bisecting the stator 40. A spaced pair of annular roller support plates 44, 45 are disposed at opposite sides of the stator assembly 40. A series of roller mounting bolts 46 (6 in the illustrated embodiment) extend between the plates 44, 45. Each of th bolts 46 rotatably supports a planet roller 47 as on bearings 48, three rollers 47 engaging drive surface 42 and three oppositely mounted rollers 49 engaging drive surface 43. the rollers 47, 49 include inwardly beveled annular drive surfaces 50 which engage against the respective drive surfaces 42, 43 of the stator assembly 40.

Intimate contact between the drive surfaces of the stators and rollers is maintained by a spring biasing arrangement next to be described. The biasing arrangement includes coil springs 51 biased between the outer surface 52 of the ring 45 and washer 53 disposed beneath adjustment retainer nut 54 mounted on bolts 46, the head portions 55 of the bolts being biased against the opposite ring 44.

An input drive pinion 56 extends through the rings 44, 45 the pinion including beveled drive surfaces 57, 58. The beveled drive surfaces of the pinion 56 engage against the radial innermost complementally beveled drive surfaces 50 of the rollers 47, 49. The innermost end 59 of pinion 56 is mounted in the inner race 60 of roller bearing assembly 61, the outer race 62 of the bearing 61 being supported in a cup shaped recess 63 in the ring 45.

An output drive shaft 64 is fixedly secured to or formed integrally with ring 45.

As will be understood from the preceding description, by adjustably tightening the nuts 54, the drive surfaces 50 of the rollers 47 and 49 are biased tightly into contact at their radial outer extremities with the drive surfaces 42, 43 of the stator assembly 40 and at their inner peripheries against the drive surfaces 57, 58 of drive pinion 56. By tightening the bolts 54, the respective drive surfaces of the stator and pinion may be forced into intimate frictional engagement, the applied forces being commensurate with and adjustable in accordance the torque transmission requirement of the device driven by the output shaft 64. It will be recognized that by slacking off on the nuts 54 it will be possible to reduce the torque which is transmitted so as to render the speed reduction device susceptible as functioning as a sort of clutch or safety mechanism which prevents damage to the device driven by output shaft 64 in the event of jamming of such device.

As is the case with the embodiment of FIGS. 1 and 2 rotary movement imparted to the pinion 56 is communicated through drive surfaces 57, 58 to the rollers 47, 49 biased against drive surfaces 42, 43 of the pinion whereby the output shaft 64 is rotated at a ratio which is a function of the relative diameters of the drive surfaces 57, 48 of pinion 56 and the diameter of the complemental surfaces 42, 43 of the stator.

Figure 5:
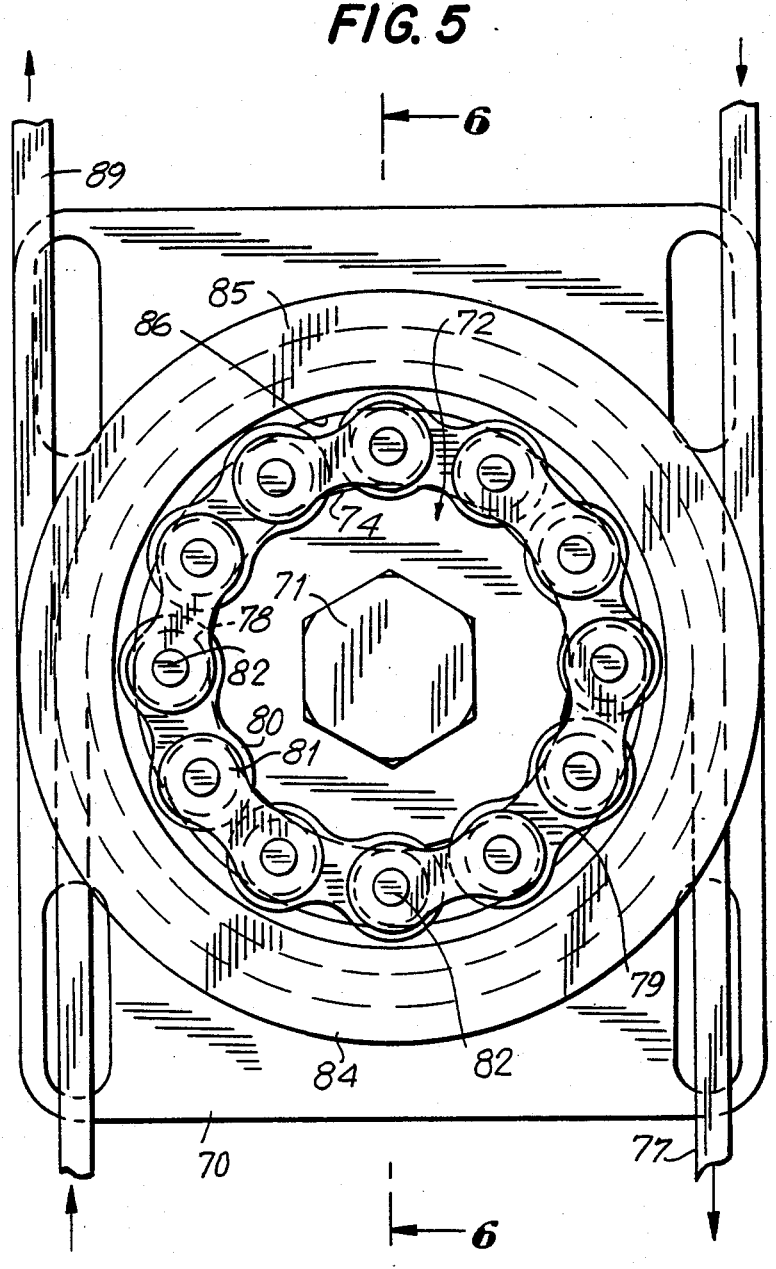
FIG. 5 is an end elevational view of a still further embodiment of the invention.
Figure 6:
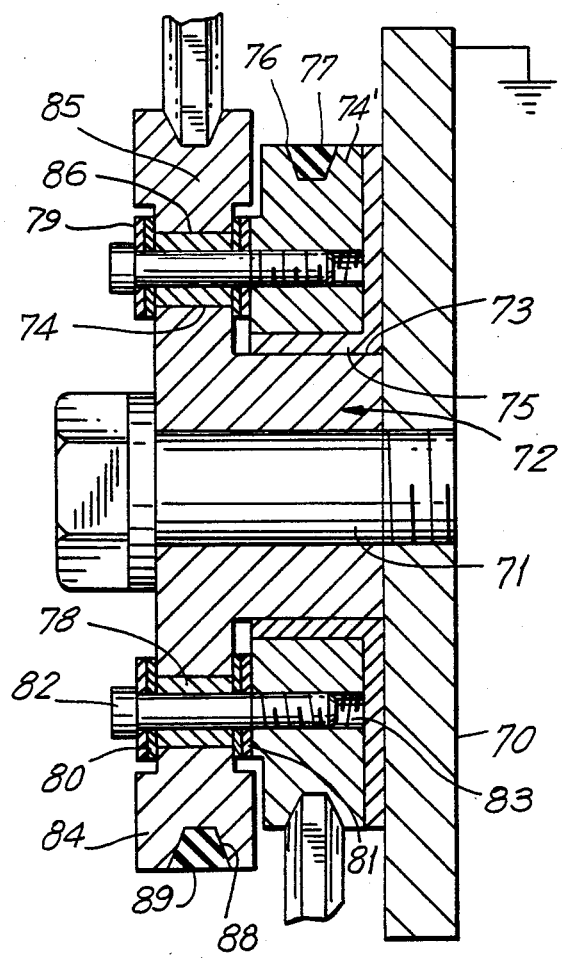
FIG. 6 is a sectional view taken on the line 6—6 of FIG. 5.

In FIGS. 5 and 6 there is disclosed a particularly compact form of speed reduction device utilizing the principles of the instant invention. More Specifically, frame members 70 has affixed thereto as by mounting bolt 71 a central stator assembly 72 including shank portion 73 and drive surface 74. Output pulley 74' is rotatably mounted on bushing 75 sleeved over the shank 73 of the stator assembly. The output pulley includes an external groove or drive channel 76 for communicating driving force to output belt 77.

A series of planet rollers 78 are mounted such that the inwardmost peripheries of the rollers are engaged with the drive surface 74 of the stator assembly 72. Conveniently, the rollers 78 are carried by an endless chain 79 surrounding the drive surface 74. The chain 79 may be comprised of side links 80 and 81 having transversely directed roller mounting studs 82 extending therethrough. The roller mounting studs which rotatably carry the respective rollers 78 are in turn threaded into tapped apertures 83 angularly spaced apart in the output pulley assembly 74. Preferably, the drive surface 74 is of a width which intrudes between the opposed side bars 80, 81 of the chain 79 so as to maintain the chain in centered relation relative to drive surface 74. As will be apparent from the foregoing, the rollers 78, in lieu of mounting on a chain, may be supported on an annular ring connected to the output pulley assembly 74.

An input drive sheave or pulley 84 surrounds the rollers 78 and preferably likewise includes an inwardly projecting angular flange 85 which extends between the side bars of the chain. The flange 85 includes an inwardly directed drive surface 86 which is pressed against the radially outermost peripheral portions of the rollers 78. Preferably, in the instant embodiment, the rollers 78 are radially expansible to maintain intimate frictional contact between the periphery of the rollers simultaneously with the drive surfaces 74 of the stator and the sheave 84. Such frictional contact is preferably derived from forming the rollers in a manner that they are radially expansible elastomer sleeves, or pneumatically inflatable.

The outer surface of the input pulley 84 is formed with a belt driving groove 88 into which groove is coupled the input drive belt 89.

As will be apparent from the preceding description, the embodiment of FIGS. 5 and 6 differs from the former embodiments by virtue of the stator surface being disposed innermost and engaging the radially innermost peripheral portions of the rollers 78 rather than being disposed in surrounding relations of the rollers. However, the operation of the device is functionally equivalent to the operation of the previously described embodiments. More specifically, when rotation is imparted to the pulley 84 by belt 89 rollers 78 are driven rotatably by virtue of their contact with drive surfaces 74 and 86. It will be appreciated that rollers 78 rotate both about their own axes, and about the main axis defined by stator 72. The rollers, which as noted are coupled to output pulley 74', drive the sheave rotatably about the stator at a reduced ratio of rotation, the ratio being a function of the differential action and of the diameter of the driving and driven surfaces 74 and 86 respectively.

As will be apparent to the skilled worker in the art, each of the described embodiments provides a compact and efficient low cost speed reducing mechanism. The three forms of apparatus specifically described herein are by no means considered to exhaust the possible structures of devices embodying the principles of the instant invention. Accordingly, the invention hereof is to be broadly construed within the scope of the appended claims.

I claim:

1. A gearless planetary speed reducer comprising a frame, a stator having an arcuate surface fixed to said frame, drive roller means having a drive surface surrounding said stator and circular in transverse section supported by said frame for rotation about a main axis coincident with the radius of said arcuate surface, said drive surface and arcuate surface defining an annular space therebetween, output drive means supported by said frame for rotation about said main axis, and a plurality of planetary roller means fixed to said output drive means for rotation about axes spaced from said main axis, said planetary roller means being disposed in said annular space and including peripheral portions in frictional driving contact with said arcuate surface and said drive surface.

2. A speed reducer in accordance with claim 1 wherein said stator includes a cylindrical outer surface.

3. A speed reducer in accordance with claim 2 wherein the outer circumference of said drive roller defines a pulley.

4. A speed reducer in accordance with claim 3 wherein the outer circumference of said output means defines a pulley.

* * * * *